(12) United States Patent
Izawa

(10) Patent No.: US 8,488,429 B2
(45) Date of Patent: Jul. 16, 2013

(54) ELECTRON BEAM EXPOSURE SYSTEM AND ELECTRON BEAM EXPOSURE METHOD

(75) Inventor: Seiichi Izawa, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/432,657

(22) Filed: Mar. 28, 2012

(65) Prior Publication Data

US 2012/0250479 A1 Oct. 4, 2012

(30) Foreign Application Priority Data

Mar. 29, 2011 (JP) ................... 2011-071380

(51) Int. Cl.
  *G11B 9/10* (2006.01)
(52) U.S. Cl.
  USPC ............. 369/101; 369/44.32; 369/53.18
(58) Field of Classification Search
  None
  See application file for complete search history.

(56) References Cited

U.S. PATENT DOCUMENTS

| | | | |
|---|---|---|---|
| 7,881,167 B1 * | 2/2011 | Wehrenberg | 369/44.33 |
| 2004/0091817 A1 | 5/2004 | Komatsu et al. | |
| 2005/0151284 A1 * | 7/2005 | Soeno | 264/1.33 |
| 2009/0005998 A1 | 1/2009 | Orishimo | |
| 2010/0322053 A1 * | 12/2010 | Morris et al. | 369/53.42 |

FOREIGN PATENT DOCUMENTS

| | | |
|---|---|---|
| JP | 6-204108 A | 7/1994 |
| JP | H11288533 A | 10/1999 |
| JP | 2003255550 A | 9/2003 |
| JP | 2006-184924 A | 7/2006 |
| JP | 2009010233 A | 1/2009 |

OTHER PUBLICATIONS

Japanese Office Action; Application No. 2011-071380; Apr. 23, 2013.

* cited by examiner

*Primary Examiner* — Wayne Young
*Assistant Examiner* — Brian Butcher
(74) *Attorney, Agent, or Firm* — Sughrue Mion, PLLC

(57) ABSTRACT

When applying an electron beam to a master substrate of disk-shaped recording medium placed on a rotation stage, while rotating the master substrate by rotating the rotation stage, to write a master pattern of disk-shaped recording medium on the master substrate, causing the writing to be suspended based on abnormality information of environment and storing a rotation angle of the master substrate when the writing is suspended and causing, thereafter, the writing to be resumed from a suspended position of the writing on the master substrate based on the rotation angle.

8 Claims, 3 Drawing Sheets

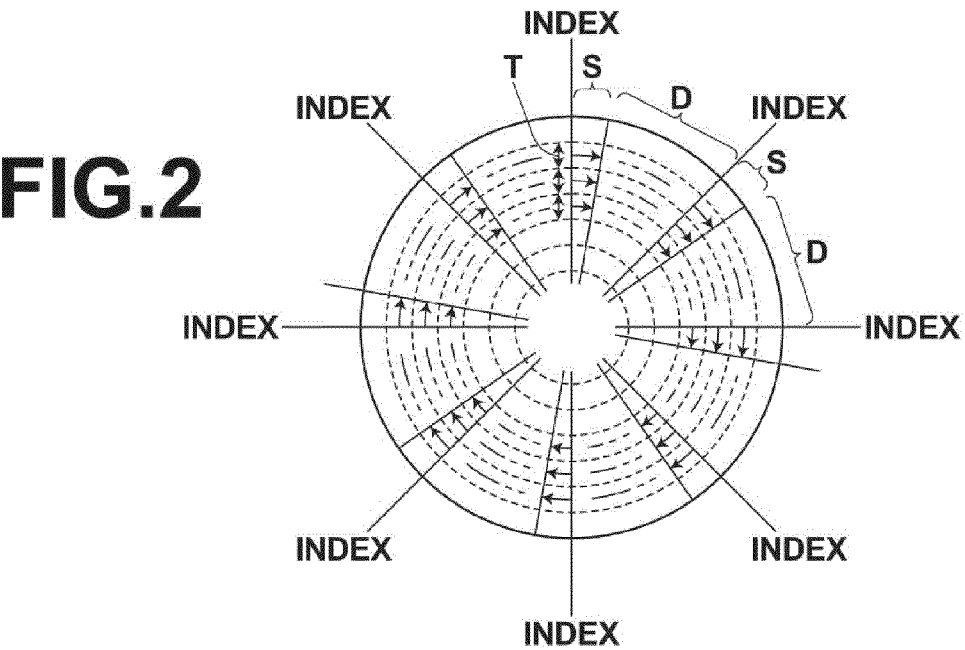
FIG.2
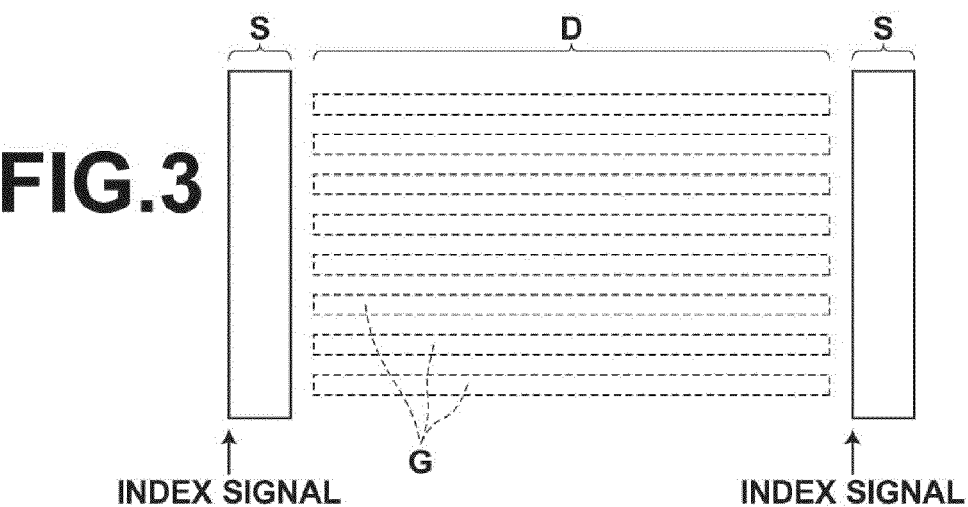
FIG.3
FIG.4
| I | OUTPUT DATA 1 | OUTPUT DATA 2 | OUTPUT DATA 3 | |
|---|---|---|---|---|
| OUTPUT DATA 4 | | OUTPUT DATA 5 | OUTPUT DATA 6 | |
| OUTPUT DATA 7 | OUTPUT DATA 8 | OUTPUT DATA 9 | ... | |
| I | OUTPUT DATA 1 | OUTPUT DATA 2 | OUTPUT DATA 3 | |
| OUTPUT DATA 4 | | OUTPUT DATA 5 | OUTPUT DATA 6 | |
| OUTPUT DATA 7 | OUTPUT DATA 8 | OUTPUT DATA 9 | ... | |
| I | OUTPUT DATA 1 | OUTPUT DATA 2 | OUTPUT DATA 3 | |

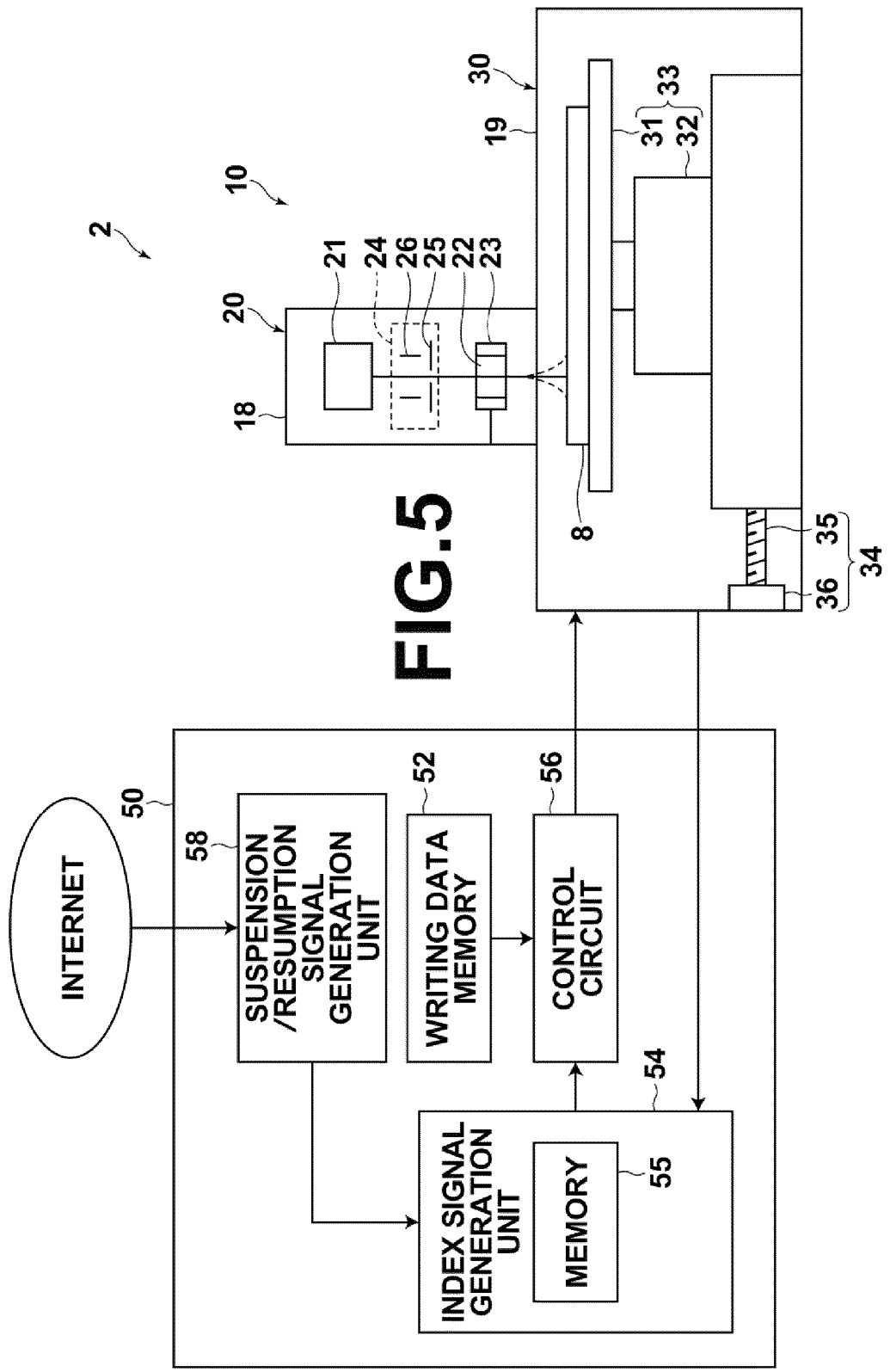

ELECTRON BEAM EXPOSURE SYSTEM AND ELECTRON BEAM EXPOSURE METHOD

BACKGROUND OF THE INVENTION

1. Field of the Invention

The present invention relates to a system that includes an electron beam exposure apparatus and an electron beam exposure method for writing a desired fine pattern when manufacturing a master substrate, such as an imprint mold or a magnetic transfer master substrate of disk-shaped recording medium. More specifically, the invention relates to control under an abnormal environment such as during an earthquake and the like.

2. Description of the Related Art

Fine patters such as servo patterns and the like are formed on disk-shaped recording media by uneven patterns or magnetic patterns. Electron beam exposure apparatuses and exposure methods for exposure writing a master pattern on a magnetic transfer master substrate or a nanoimprint master substrate by an electron beam according to a pattern to be formed on a disk-shaped recording medium are proposed. Such electron beam exposure methods include a method in which a substrate (master for disk-shaped recording medium) coated with a resist is placed on a rotation stage and, while the substrate is being rotated by rotating the rotation stage, an electron beam is applied on the substrate according to a pattern shape as described, for example, in U.S. Patent Application Publication No. 20040091817 (Patent Document 1) and Japanese Unexamined Patent Publication No. 2006-184924.

Generally, the electron beam exposure apparatuses are installed and used under certain environmental conditions stipulated in the installation specifications. In the mean time, when a value of environment item, such as shaking (earthquake), magnetic field, or temperature, changes over a certain range, the writing pattern may have a defect due to a change in the relationship between the electron beam and master substrate in the apparatus. For example, an earthquake may affect a writing pattern over a wide range of more than 100 cylinders (tracks). Further, in the case where the apparatus is installed in a place near a main road or railroad, the magnetic field may sometimes be changed largely as a truck or a train passes. In the case where the change in the magnetic field exceeds the allowable range, the writing pattern may have a defect due to displacement of the electron beam application position. Such masters of magnetic recording media are treated as defective products simply because of a partial defect due to such a temporal environmental change. As it will take several days to about ten days to write a predetermined fine pattern on one master substrate of magnetic recording medium, the treatment of the master substrate as a defective product due to a partial defect caused by a temporal environmental change will result in significant productivity degradation.

Japanese Unexamined Patent Publication No. 6(1994)-204108 (Patent Document 3) proposes a semiconductor exposure apparatus used for manufacturing semiconductor devices, such as ICs and LSIs, which is protected from earthquakes by providing a seismic detection sensor, a means for terminating the operation of the apparatus when an earthquake is detected by the sensor, and a means for resuming the operation of the apparatus.

In the case of the semiconductor exposure apparatus described in Patent Document 3, a pattern is written on a wafer placed on an X-Y stage. Thus, the termination in the middle of writing and resumption of the writing may be implemented by simply OFF/ON controlling the beam (ON/OFF controlling the blanking).

In the mean time, in the electron beam exposure apparatus for a master substrate of disk-shaped recording medium, exposure writing is performed by applying an electron beam on the master substrate while the substrate is being rotated. Consequently, the simple OFF/ON control of the electron beam does not allow the writing to be resumed from the terminated position and a desired pattern can not be written continuously.

The present invention has been developed in view of the circumstances described above, and it is an object of the present invention to provide an electron beam exposure system for performing electron beam writing on a rotated master substrate and electron beam exposure method capable of implementing control such that the master substrate is protected from becoming defective even during a temporal abnormal environmental change.

SUMMARY OF THE INVENTION

An electron beam exposure system of the present invention is a system, including:

an electron beam exposure apparatus for applying an electron beam to a master substrate of disk-shaped recording medium placed on a rotation stage, while rotating the master substrate by rotating the rotation stage, to write a master pattern of disk-shaped recording medium on the master substrate; and a control apparatus for controlling the writing of the electron beam exposure apparatus by sending a writing data signal, which is based on design writing data, to the electron beam exposure apparatus, wherein the control apparatus includes a suspension control unit for causing the writing to be suspended based on abnormality information of environment inputted from outside, storing a rotation angle of the master substrate when the writing is suspended, and causing the writing to be resumed from a suspended position of the writing on the master substrate based on the rotation angle.

In the electron beam exposure system of the present invention, it is preferable that the control apparatus is configured to generate a writing data signal group for each predetermined area in a circumferential direction at each radial position based on the design writing data and to sequentially send data signals of each writing data signal group individually with respect to each predetermined area to the electron beam exposure apparatus as the writing data signal and the suspension control unit is configured to cause the writing to be suspended after completion of current writing based on data signals of a writing data signal group in process when the abnormality information of environment is inputted.

The term "when the abnormality information of environment is inputted" as used herein refers to a time point at which the writing is to be terminated. It is not limited to a time point right after the abnormality information of environment is inputted but may include, if the information is earthquake prediction information predicting an earthquake after a given time, a period from the time right after the information is inputted to the given time.

The system may include an environment value measurement apparatus connected to the control apparatus and configured to measure a value of a predetermined environment item of the environment and to input the abnormality information of environment to the control apparatus when the measured value of the predetermined environment item is outside a predetermined range.

In the case where the electron beam exposure apparatus of the present invention includes the environment value measurement apparatus, it is preferable that the suspension control unit is configured to cause the writing to be suspended when the abnormality information of environment is continuously inputted from the environment value measurement apparatus for a predetermined period of time.

It is also preferable that the suspension control unit is configured to cause the writing to be resumed after the value measured by the environment value measurement apparatus returns within the predetermined range.

In the electron beam exposure system of the present invention, the control apparatus may be connected to a wide area network to receive the abnormality information of environment from the wide area network.

In the case where the electron beam exposure system of the present invention is connected to the wide area network, it is preferable that the suspension control unit is configured to cause the writing to be resumed after a predetermined period of time from the time when the writing is suspended if the abnormality information of environment is information of an earthquake.

An electron beam exposure method of the present invention is a method for applying an electron beam to a master substrate of disk-shaped recording medium placed on a rotation stage, while rotating the master substrate by rotating the rotation stage, to write a master pattern of disk-shaped recording medium on the master substrate, the method comprising the steps of:

causing the writing to be suspended based on abnormality information of environment and storing a rotation angle of the master substrate when the writing is suspended; and causing, thereafter, the writing to be resumed from a suspended position of the writing on the master substrate based on the rotation angle.

According to the electron beam exposure system and electron beam exposure method of the present invention, when suspending the writing based on abnormality information of environment, a rotation angle of the rotated master substrate is stored and the writing is resumed from a suspended position of the writing on the master substrate based on the rotation angle. Even if a temporary environmental change, such as an earthquake or the like, occurs during exposure writing of a master substrate, this may prevent or minimize defects in the master substrate, thereby preventing the master substrate from being wasted and this, in turn, may prevent the degradation in productivity.

BRIEF DESCRIPTION OF THE DRAWINGS

FIG. 2 schematically illustrates a master pattern of disk-shaped recording medium.

FIG. 3 is a partial enlarged view of the master pattern shown in FIG. 2.

FIG. 4 schematically illustrates a structure of writing data signal groups stored in a writing data memory.

FIG. 5 is a block diagram of an electron beam exposure system according to a second embodiment of the present invention, illustrating a schematic configuration thereof.

DESCRIPTION OF THE PREFERRED EMBODIMENTS

Figure 1:
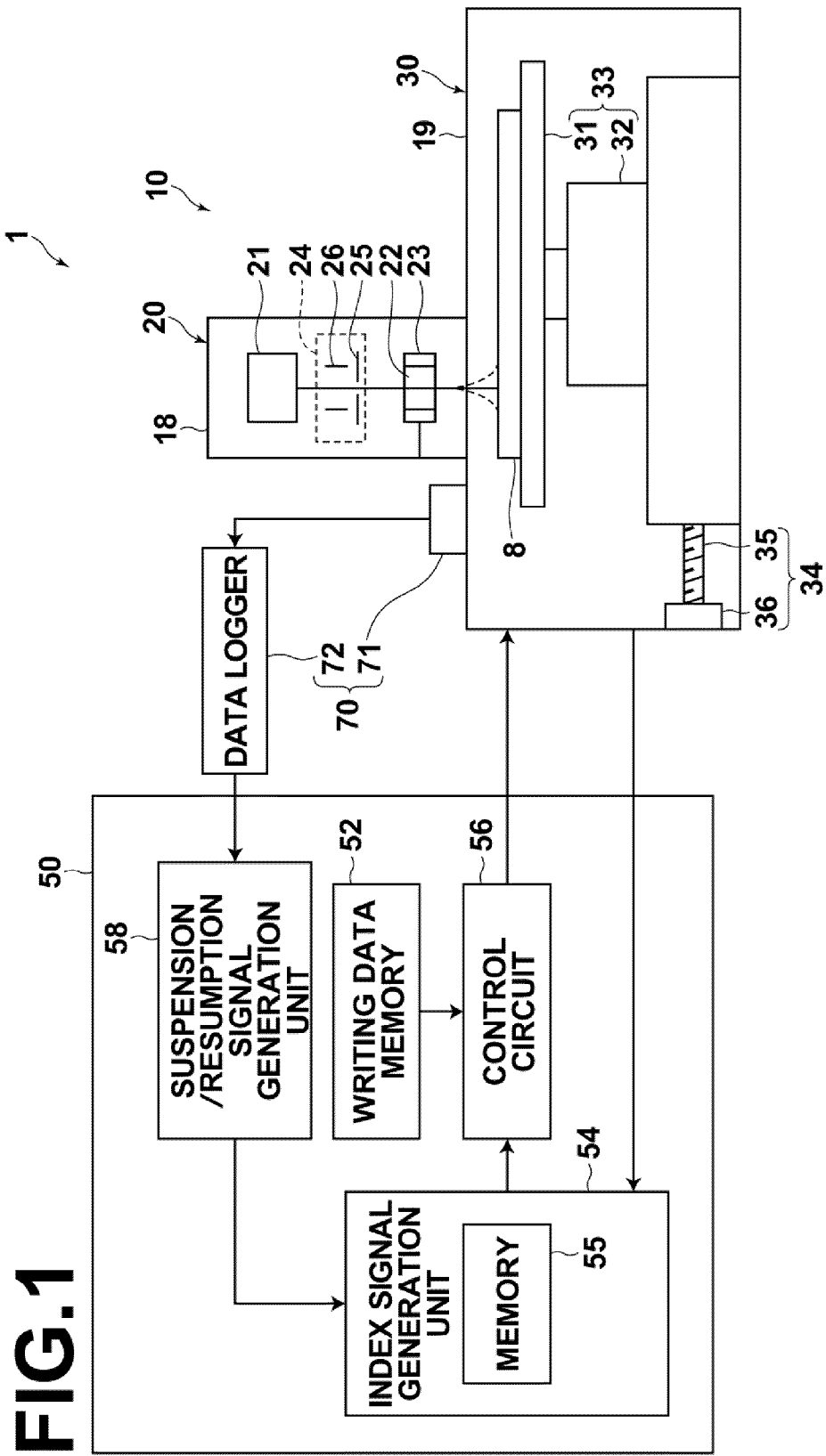
FIG. 1 is a block diagram of an electron beam exposure system according to a first embodiment of the present invention, illustrating a schematic configuration thereof.

Hereinafter, embodiments of the present invention will be described with reference to the accompanying drawings.

An electron beam exposure system 1 according to a first embodiment of the present invention will be described first. FIG. 1 is a block diagram of the electron beam writing system 1 according to the first embodiment of the present invention, illustrating a schematic configuration thereof. The electron beam writing system 1 includes an electron beam exposure apparatus 10 for applying an electron beam to a master substrate 8 of disk-shaped recording medium placed on a rotation stage 31, while rotating the master substrate 8 by rotating the rotation stage 31, to write a master pattern of disk-shaped recording medium on the master substrate 8, and a control apparatus 50 for controlling the writing of the electron beam exposure apparatus 10 by sending a writing data signal, which is based on design writing data, to the electron beam exposure apparatus 10.

The electron beam exposure apparatus 10 includes an electron beam application unit 20 for applying an electron beam to the master substrate 8 and a mechanical drive unit 30 for rotating and linearly moving the master substrate 8.

The electron beam application unit 20 includes an electron gun 21 that emits an electron beam within lens tube 18, deflection units 22, 23 that deflect the electron beam in a radial direction Y and a circumferential direction X, as well as microscopically vibrating back and forth in the circumferential direction X with constant amplitude, and aperture 25 and blanking 26 (deflector) as blanking unit 24 for causing application/non-application of the electron beam onto the master substrate 8. The electron beam emitted from the electron gun 21 is applied to the master substrate 8 through deflection units 22, 23, a not shown electromagnetic lens, and the like.

The aperture 25 of the blanking unit 24 has a through hole in the center for passing the electron beam, and the blanking 26 operates according to input of an ON/OFF signal for the application of the electron beam, in which it passes the electron beam through the through hole of the aperture 25 to apply the electron beam to the master substrate 8 during ON-signal (blanking OFF) without deflecting the beam, while it blocks the electron beam with the aperture 25 by deflecting the beam so as not to pass through the through hole of the aperture 25 during OFF-signal (blanking ON), so that the electron beam is not directed onto the substrate.

The mechanical drive unit 30 includes a rotation stage unit 33 having a rotation stage 31 that supports the master substrate and a rotary drive mechanism 32 having a spindle motor inside of a housing 19 on which a lens tube 18 is disposed, and a linear moving unit 34 that linearly moves the rotation stage unit 33 in radial directions of the rotation stage 31. The linear moving unit 34 includes a rod 35 having accurate threading threadably mounted on a portion of the rotation stage unit 33 and a pulse motor 36 that rotary drives the rod 35 in forward and reverse directions. The rotation stage unit 33 further includes an encoder, not shown, that outputs an encoder signal according to the rotation angle of the rotation stage 31. The encoder includes a rotation plate having multiple radial slits formed therein and attached to the motor shaft of the spindle motor 32 and an optical device that optically reads the slits to output an encoder signal.

The control apparatus 50 is an apparatus that sequentially sends a data signal of writing data signal groups to the electron beam exposure apparatus 10 as a control signal. The control signal includes a deflection signal for deflecting the electron beam, electron beam application/non-application signal (blanking OFF/ON signal), a rotation reference pulse signal, and the like.

The control apparatus 50 includes a writing data memory 52 for storing a writing data signal group generated for each predetermined area in a circumferential direction at each radial position of a master pattern based on design data (writing pattern, data representing writing timing) of a pattern (master pattern of disk-shaped recording medium) to be written, an index signal generation unit 54 for generating an index signal (INDEX) for taking the timing of writing, a control circuit (control IC) 56 for generating a control signal from the writing data signal group in the memory 52 and sending the control signal to the electron beam writing apparatus 10, and a suspension/resumption signal generation unit 58 for generating a suspension signal for suspending the writing based on abnormality information of environment inputted from outside and a resumption signal for resuming the writing thereafter. Here, the index signal generation unit 54, control circuit 56, and suspension/resumption signal generation unit 58 constitute the suspension control unit. The control apparatus 50 may specifically be formed of a so-called formatter or the formatter and a personal computer connected thereto.

The output timing of a control signal by the control circuit 56 is controlled by an index signal from the index signal generation unit 54.

The index signal is generated in the index signal generation unit 54 from the output (A/B/Z phase signals) of the encoder provided in the rotation stage unit 33 and a writing clock generated inside of the control unit. For example, the index signal generation unit 54 is configured to generate an index signal after predetermined number of clocks from an encoder signal generated immediately before each predetermined area.

FIG. 2 schematically illustrates the relationship between a master pattern (writing pattern) of disk-shaped recording medium and writing start timing. FIG. 3 is a partial enlarged view of the master pattern shown in FIG. 2. Here, a master pattern of discrete track medium, as the disk-shaped recording medium, is illustrated. As shown in FIGS. 2 and 3, the master pattern includes servo areas S and data areas D disposed alternately in a circumferential direction. The servo areas S are elongated areas extending substantially radially from the center of concentric circles. Although the servo area is generally formed in an arc shape extending in a radial direction, it is schematically indicated here as a linear shape. The servo area S includes fine patterns (not shown) of preamble, address, servo, and the like, while the data area D includes groove patterns for separating tracks T. In the present embodiment, it is assumed that one sector, constituted by one servo area and one adjacent data area, is regarded as the predetermined area and the writing is started for each predetermined area based on the index signal.

FIG. 4 schematically illustrates a structure of writing data signal groups stored in the writing data memory 52. As shown in FIG. 4, the writing data memory 52 includes, as the writing data signal group for each predetermined area, a data stream of one sector constituted by an index flag I followed by output data 1, output data 2, - - - . The data signal groups may be those generated in advance as data streams and stored in the memory 52 or those sequentially stored in the memory 52 as data streams generated during the writing operation.

Here, it is assumed that the index flag I is set with respect to each sector, but it may be set with respect to each track or more frequently than for each sector.

When an index signal is inputted from the index signal generation unit 54, the control circuit 56 reads out writing data for one sector having a given index flag attached thereto from the memory 52 and sequentially sends them to the electron beam exposure apparatus 10 as the control signal, and when a next index signal is inputted, the control circuit 56 reads out writing data for one sector having a next index flag attached thereto from the memory 52 and sequentially sends them to the electron beam exposure apparatus 10 as the control signal.

Further, the index signal generation unit 54 includes a memory 55 for storing a rotation angle of the master substrate 8 when the writing is suspended. More specifically, signals synchronized with rotation angles, i.e., encoder signals may be counted and the encoder signal when writing is suspended may be stored to indirectly store the rotation angle of the master substrate. When the writing is to be resumed, the index signal generation unit 54 generates an index signal based on the rotation angle stored in the memory 55 and outputs the index signal to the control circuit 56 so that the writing is resumed from a suspended position of the writing on the master substrate.

The electron beam exposure system 1 of the present embodiment further includes an environment value measurement apparatus 70 connected to the control apparatus 50 and configured to measure a value of a predetermined environment item of the environment in which the system 1 is installed. The environment value measurement apparatus 70 includes a sensor 71 disposed on the housing 19 of the mechanical drive unit 30, and a data logger 72 for collecting a value measured by the sensor 71 and inputting abnormality information of environment, such as the measured value or a warning, to the control circuit 50 when the measured value is outside a predetermined range.

The environment item may be shaking, magnetic field, temperature, or humidity. The sensor 71 may be anything as long as it is capable of measuring any one or a plurality of them, and a seismic intensity meter, magnetic field measuring instrument, thermometer, or hygrometer may be a specific example. Preferably, the sensor 71 is disposed so as to contact the electron beam exposure apparatus 10. It is particularly preferable that the sensor 71 is disposed at a location near the master substrate from which the electron beam is applied.

In an exposure method using the electron beam exposure system 1 of the present embodiment, an operation of the system 1 under an environmental abnormality will be described.

A value of a predetermined environment item measured by the sensor 71 during the writing of the master pattern is stored in the data logger 72, which is a data collection apparatus. When the value of the predetermined environment item obtained from the sensor 71 exceeds a predetermined range (upper limit and/or lower limit), the data logger 72 sends abnormality information of environment to the control apparatus 50. The abnormality information of environment may be the measured value itself or a warning of abnormality.

In the case where shaking is measured as the environment item, acceleration rates, for example, not greater than 0.15 cm/s$^2$ may be deemed to be normal values (predetermined range) and when the acceleration rate exceeds the value described above, the abnormality information of environment may be sent from the data logger 72 to the control apparatus 50. In the case where magnetic field is measured as the environment item, alternating magnetic field, for example, not greater than 0.1 μT may be deemed to be normal values, and when the alternating magnetic field exceeds the value described above, the abnormality information of environment may be sent to the control apparatus 50.

When abnormality information of environment is received from the data logger 72, the control apparatus 50 causes the writing to be suspended after the writing is continued to a position where the writing can be suspended and stores the position (rotation angle of master substrate) where the writing is suspended in the memory.

More specifically, the abnormality information of environment is inputted to the suspension/resumption signal generation unit 58 of the control apparatus 50, where a determination is made as to whether or not the writing is suspended. The suspension/resumption signal generation unit 58 may be configured to generate a suspension signal as soon as the abnormality information of environment is inputted or after the information is continuously received for more than a certain period of time.

For example, the suspension signal may be generated after the information is continuously received for not less than one second if the environment item is shaking, for not less than 0.5 seconds if the environment item is magnetic field, for not less than 10 minutes if the environment item is temperature, and for not less than 10 minutes if the environment item is humidity.

The suspension signal generated in the suspension/resumption signal generation unit 58 is inputted to the index signal generation unit 54. Then, index signal generation unit 54 terminates the generation of index signal. The control circuit 56 sends all control signals of the writing data group of a predetermined area in process when the suspension signal is received to the electron beam exposure apparatus 10, and the electron beam exposure apparatus 10 continues writing to the end of the predetermined area. For example, in the case where the output data 1 and output data 2 following the first index flag I shown in FIG. 4 are being sent to the electron beam exposure apparatus 10 when the suspension signal is received, remaining output data before the next index flag I will be sent to the electron beam exposure apparatus 10. Since no new index signal is inputted from the index signal generation unit 54, the control circuit 56 sends only a blanking-ON (beam-OFF) signal to the electron beam exposure apparatus 10 after sending all the data of the writing data group, thereby, in effect, terminating the writing of the electron beam exposure apparatus 10.

Thereafter, when the environmental abnormality is recovered and the input of the abnormality information of environment from the data logger 72 is ceased, the suspension/resumption signal generation unit 58 generates a resumption signal. The suspension/resumption signal generation unit 58 may be configured to generate the resumption signal as soon as the input of the abnormality information of environment from the data logger 72 is ceased or after no information is continuously received for more than a certain period of time.

The resumption signal is inputted to the index signal generation unit 54 and the index signal generation unit 54 generates an index signal immediately following the writing data group at which the writing was suspended. The index signal generated by the index signal generation unit 54 is outputted to the control circuit 56 and the writing is resumed. Here, based on the rotation angle (encoder signal) of the master substrate at the time of suspension stored in the memory 55, the writing is started from a suspended position of the writing on the master substrate using the writing data stream with the flag immediately following the writing data group for which all the data have been sent prior to the suspension.

As described above, according to the present electron beam exposure system 1, the writing may be suspended promptly when an environmental abnormality occurs, so that defects due to an environmental change may be prevented or minimized. Further, the writing may be resumed from a suspended position of the writing on a rotated master substrate, so that the defect of pattern overlapping or lacking may also be prevented.

In the case where the suspension lasts for more than several tens of minutes, there arises a concern that a large displacement of positional relationship may occur. It is preferable, therefore, that the system 1 is configured to move from suspension to termination of writing in the case where the environmental abnormality is not recovered after a certain period of time (e.g., 30 minutes). More specifically, in the case where the temperature is measured as the environment item, if the temperature is continuously higher than a predetermined range for more than ten minutes, the suspension processing is performed. Thereafter, if the temperature is continuously higher than the predetermined range for more than thirty minutes, the writing is terminated.

Further, in the case where the abnormal conditions occur prescribed number of times (e.g., three or five times), it is preferable that the system 1 is configured to perform writing termination processing when the abnormal condition occurs the prescribed number of times. The reason is that a plurality of abnormal conditions causes the defect in the master substrate to be not negligible, whereby the master substrate is regarded as a defective product.

If such termination processing is performed in the case where it is highly likely that the master substrate will become a defective product even if the writing is continued, the degradation in productivity may be prevented as a result.

In the present embodiment, the suspension/resumption signal generation unit 58 is provided, but an arrangement may be adopted in which an input signal of abnormality information of environment from outside of the control apparatus 50 is inputted to the index signal generation unit 54 as the suspension signal.

Next, an electron beam exposure system according to a second embodiment of the present invention will be described. FIG. 5 is a block diagram of the electron beam exposure system according to the second embodiment of the present invention, illustrating a schematic configuration thereof. In FIG. 5, components identical to those of the electron beam exposure system 1 shown in FIG. 1 are given the same reference numerals and will not be elaborated upon further here.

The electron beam exposure system 2 of the present embodiment differs from the electron beam exposure system 1 of the first embodiment in that it is not provided with the environment value measurement apparatus. In the electron beam exposure system 2, the control apparatus 50 is connected to a wide area network (Internet) to receive abnormality information of environment from the Internet.

The abnormality information of environment received from the Internet may include an earthquake early warning message.

When an earthquake early warning message is received, suspension/resumption signal generation unit 58 of the electron beam exposure system 2 generates a suspension signal. The suspension processing based on the suspension signal is identical to that of the first embodiment. The suspension signal may be generated as soon as the earthquake early warning message is received to perform suspension processing, or termination processing may be performed if the earthquake location is near the place where the electron beam exposure system 2 is installed.

The duration of earthquake shaking is several minutes at longest. Therefore, when the suspension processing is performed based on the earthquake early warning message, a resumption signal may be generated in the suspension/resumption signal generation unit to resume the writing after a certain period of time (e.g., after ten minutes).

The electron beam exposure apparatus 2 of the present embodiment may promptly suspend the writing immediately before or after an occurrence of environmental abnormality, so that defects due to an environmental change may be prevented or minimized. Further, the writing may be resumed from a suspended position of the writing on a rotated master substrate, so that the defect of pattern overlapping or lacking may also be prevented.

As an exposure writing system, the system may include the environment value measurement apparatus 70 and further the control apparatus 50 may be connected to a wide area network, whereby the system may be configured to perform suspension processing of writing based on at least one of the information from the environment value measurement apparatus 70 and information from the wide area network.

What is claimed is:

1. An electron beam exposure system, comprising:
    an electron beam exposure apparatus for applying an electron beam to a master substrate of disk-shaped recording medium placed on a rotation stage, while rotating the master substrate by rotating the rotation stage, to write a master pattern of disk-shaped recording medium on the master substrate; and
    a control apparatus for controlling the writing of the electron beam exposure apparatus by sending a writing data signal, which is based on design writing data, to the electron beam exposure apparatus,
    wherein the control apparatus includes a suspension control unit for causing the writing to be suspended based on abnormality information of environment inputted from outside, storing a rotation angle of the master substrate when the writing is suspended, and causing the writing to be resumed from a suspended position of the writing on the master substrate based on the rotation angle.

2. The electron beam exposure system of claim 1, wherein:
    the control apparatus is configured to generate a writing data signal group for each predetermined area in a circumferential direction at each radial position based on the design writing data and to sequentially send data signals of each writing data signal group individually with respect to each predetermined area to the electron beam exposure apparatus as the writing data signal; and
    the suspension control unit is configured to cause the writing to be suspended after completion of current writing based on data signals of a writing data signal group in process when the abnormality information of environment is inputted.

3. The electron beam exposure system of claim 1, wherein the system includes an environment value measurement apparatus connected to the control apparatus and configured to measure a value of a predetermined environment item of the environment and to input the abnormality information of environment to the control apparatus when the measured value of the predetermined environment item is outside a predetermined range.

4. The electron beam exposure system of claim 3, wherein the suspension control unit is configured to cause the writing to be suspended when the abnormality information of environment is continuously inputted from the environment value measurement apparatus for a predetermined period of time.

5. The electron beam exposure system of claim 3, wherein the suspension control unit is configured to cause the writing to be resumed after the value measured by the environment value measurement apparatus returns within the predetermined range.

6. The electron beam exposure system of claim 1, wherein the control apparatus is connected to a wide area network to receive the abnormality information of environment from the wide area network.

7. The electron beam exposure system of claim 6, wherein the suspension control unit is configured to cause the writing to be resumed after a predetermined period of time from the time when the writing is suspended if the abnormality information of environment is information of an earthquake.

8. An electron beam exposure method for applying an electron beam to a master substrate of disk-shaped recording medium placed on a rotation stage, while rotating the master substrate by rotating the rotation stage, to write a master pattern of disk-shaped recording medium on the master substrate, the method comprising the steps of:
    causing the writing to be suspended based on abnormality information of environment and storing a rotation angle of the master substrate when the writing is suspended; and
    causing, thereafter, the writing to be resumed from a suspended position of the writing on the master substrate based on the rotation angle.

* * * * *